US012731204B2

(12) United States Patent
Coucaud et al.

(10) Patent No.: US 12,731,204 B2
(45) Date of Patent: Sep. 8, 2026

(54) GRAPHICS PROCESSING UNIT AND METHOD OF GRAPHICS PROCESSING

(71) Applicant: Arm Limited, Cambridge (GB)

(72) Inventors: Philippe André Jean-Baptiste Coucaud, Lund (SE); Christopher Edouard Gautier, Malmö (SE); Mark Stephen Bellamy, Austin, TX (US)

(73) Assignee: Arm Limited, Cambridge (GB)

( * ) Notice: Subject to any disclaimer, the term of this patent is extended or adjusted under 35 U.S.C. 154(b) by 164 days.

(21) Appl. No.: 18/624,998

(22) Filed: Apr. 2, 2024

(65) Prior Publication Data

US 2025/0307978 A1 Oct. 2, 2025

(51) Int. Cl.

*G06T 1/20* (2006.01)
*G06F 9/38* (2018.01)
*G06T 11/40* (2006.01)

(52) U.S. Cl.

CPC .............. *G06T 1/20* (2013.01); *G06F 9/3861* (2013.01); *G06T 11/40* (2013.01)

(58) Field of Classification Search

CPC .......... G06T 1/20; G06T 11/40; G06F 9/3861
See application file for complete search history.

(56) References Cited

U.S. PATENT DOCUMENTS

2015/0220375 A1* 8/2015 Pacejo ...................... G06F 8/30 719/330
2018/0286006 A1* 10/2018 Kaburlasos .............. G06T 1/60
2020/0175645 A1* 6/2020 King ..................... G06T 11/203
2020/0380758 A1* 12/2020 Novales .................... G06T 1/60
2021/0001220 A1* 1/2021 Cerny ....................... G06T 1/20
2023/0042089 A1* 2/2023 Choi ...................... H04N 19/91
2023/0401778 A1* 12/2023 Howson .................... G06T 1/60

FOREIGN PATENT DOCUMENTS

EP 3663918 6/2020

OTHER PUBLICATIONS

European Extended Search Report for European Application No. 25167553.4 mailed Aug. 20, 2025.
Dimitrov, Martin et al., "Understanding Software Approaches for GPGPU Reliability", University of Central Florida, Orlando. Mar. 8, 2009.

* cited by examiner

*Primary Examiner* — Daniel F Hajnik
*Assistant Examiner* — Joshua Jungwook Suo
(74) *Attorney, Agent, or Firm* — DeWitt LLP

(57) ABSTRACT

A method of operation of a tile-based graphics processor, including: receiving an instruction to process data to produce an output; detecting an indicator that a portion of the output is to be processed with redundancy; associating the indicator with at least one tile associated with the portion of the output; duplicating the processing of the data associated with the at least one tile by one or more execution units of the graphics processor to produce output data for each of a first and a second instance of the at least one tile; comparing output data for the first and the second instances of the at least one tile generated by the one or more execution units of the graphics processor; and responsive to detection of a mismatch between the output data of the first and the second instances, communicating a signal.

15 Claims, 8 Drawing Sheets

GRAPHICS PROCESSING UNIT AND METHOD OF GRAPHICS PROCESSING

FIELD

The present technology relates to the processing of computer graphics, in particular, to safety critical applications where accuracy of the output display is important.

BACKGROUND

There are requirements for the development of software for safety-related systems installed in safety-critical systems such as the displays used in road vehicles and the like.

One of the requirements is known as redundancy. Redundancy is a mechanism used to achieve safety compliance as defined in, for example, ISO 26262 standard as of 2024.

There are known methods to achieve redundancy, and these include redundant hardware and redundant software. Redundant hardware is where the same workload is executed multiple times on symmetrical or asymmetrical processors and the output is compared and differences are flagged. Redundant software is where the same or different software is executed multiple times, often in parallel or with time redundancy and the output compared and differences are flagged.

Both come with an introduced processing overhead because computation needs to be performed multiple times. The processing overhead is embodied in additional hardware components or additional software calculations both of which consume processing power and resource.

SUMMARY

According to a first aspect of present techniques, there is provided a method of operation of a tile-based Graphics Processor, comprising: receiving an instruction to process data to produce an output; detecting an indicator that a portion of the output is to be processed with redundancy; associating the indicator with at least one tile associated with the portion of the output; duplicating the processing of the data associated with the at least one tile by one or more execution units of the graphics processor to produce output data for each of a first and a second instance of the at least one tile; comparing output data for the first and the second instances of the at least one tile generated by the one or more execution units of the graphics processor; and responsive to detection of a mismatch between the output data of the first and the second instances, communicating a signal.

Accordingly, a redundancy mechanism which can be enabled for data per tile seeks to reduce the processing overhead. Such a mechanism exposed at an Application Programming Interface level allows a user to select which amount of redundancy is required for example per draw cell, pixels or tiles to control performance overhead and model mitigation of failure rates.

The data processed to produce an output is any data suitable in form for processing in accordance with a graphics processing pipeline. Such data may comprise data composing an image, image data, display data, texture data, depth data, shading data or compute data.

According to a second aspect of present techniques there is provided a method implemented by a driver on a host processor; wherein the method includes responsive to an Application Programming Interface (API) command indicating a portion of data is to be processed with redundancy communicating by the driver to a graphics processor configured as a tile-based graphics processor: an instruction to process the data to produce an output; and an indicator that the portion of the output is to be processed with redundancy.

Through the API, a user can modify instructions to include a selection of redundant tiles and Graphics Processor core mapping.

Instead of computing each shader core for the full frame multiple times, a computation needs only to be repeated for data associated with selected tiles. In this way, only some specific warps are executed multiple times and comparison only occurs inside some specific tiles.

Such a mechanism does not require a duplication of the full hardware units, only the GPU tiler is extended to operate comparison when requested at either instruction or descriptor level. The remaining redundancy is achieved in software by enqueuing warps multiple times.

According to a third aspect of present techniques there is provided a Tile-based graphics processor comprising one or more execution units and a comparator, wherein the one or more execution units comprise circuitry configured to receive from the processor data for processing associated with at least one tile to produce output data for each of a first and second instance of the at least one tile, wherein the comparator comprises circuitry for comparing output data for the first and second instances of the at least one tile generated by the one or more execution units of the graphics processor; and responsive to detection of a mismatch between the output data of the first and second instances, circuitry configured to communicate a signal.

According to embodiments of the present technology, a graphics processor is operated to generate a processing output for a frame formed of a plurality of tiles, for example to generate a render output that is an image to be displayed.

A further aspect of the present technology provides a non-transitory computer readable storage medium storing software code which, when executing on a processor, performs a method of operating a graphics processor as described herein. In such a technique a non-transitory computer readable storage medium stores software code which, when implemented by a driver on a host processor causes the driver to indicate that a portion of data is to be processed with redundancy and to communicate to a tile-based graphics processor an instruction to process the data to produce an output; and an indicator that the portion of the output is to be processed with redundancy.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

Embodiments will now be described, with reference to the accompanying drawings, in which.

DETAILED DESCRIPTION

The present technology relates to tile-based graphics processing. The exemplary graphics processing pipeline 10 shown in FIG. 1 is a tile-based renderer that produces tiles of a render output data array, such as an output frame to be displayed.

Figure 1:
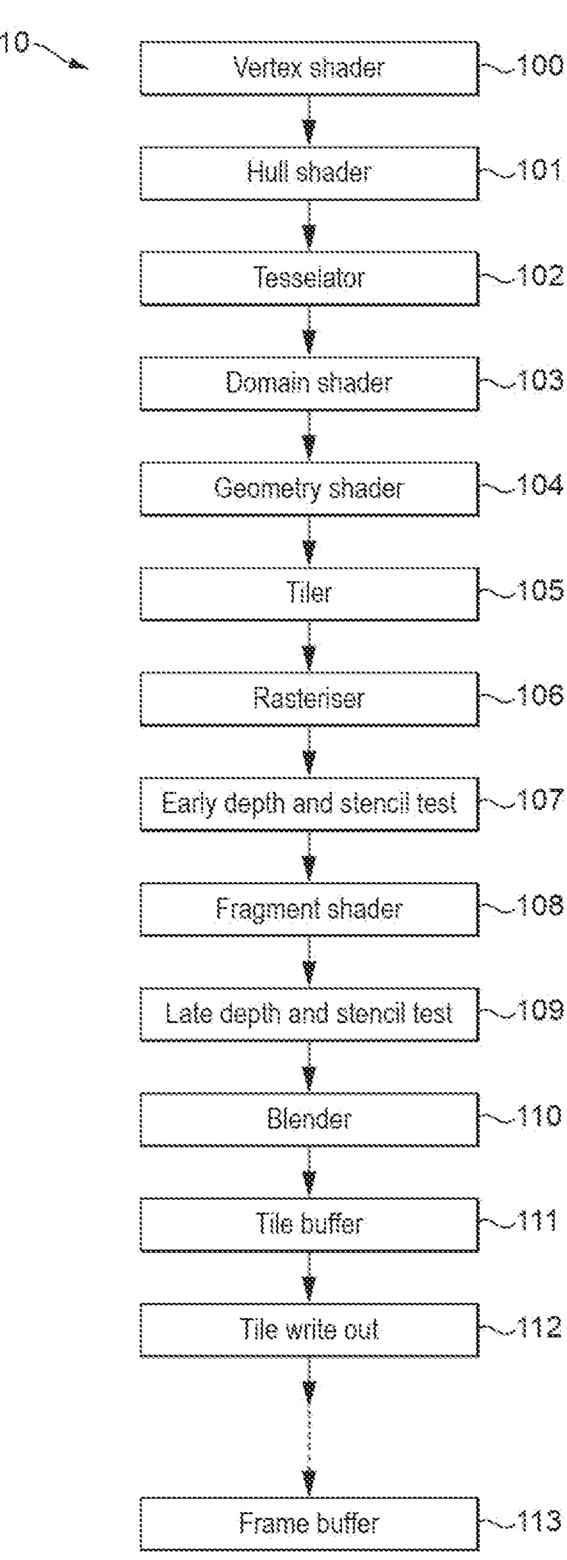
FIG. 1 shows an exemplary graphics processing pipeline.

FIG. 1 shows the main elements and pipeline stages of the graphics processing pipeline 10. As will be appreciated by those skilled in the art, there may be other elements of the graphics processing pipeline that are not shown in FIG. 1. It should be noted here that FIG. 1 is only schematic, and that, for example, in practice, the shown functional units and pipeline stages may share significant hardware circuits, even though they are shown functionally as separate states in FIG. 1. It will also be appreciated that each of the stages, elements and units, etc., of the graphics processing pipeline 10 may be implemented as desired and may accordingly comprise, e.g., appropriate circuitry and/or processing logic, etc., for performing the necessary operation and functions.

The graphics processing pipeline 10 includes a number of stages, including vertex shader 100, a hull shader 101 (in DirectX, or a Tessellation Control Shader in Vulkan or OpenGL), a tessellator 102, a domain shader 103 (in DirectX, or a Tessellation Evaluation Shader in Vulkan or OpenGL), a geometry shader 104 and a tiler 105. In tile-based rendering, a render output is divided into a plurality of smaller regions, herein referred to as "tiles". Each tile is rendered separately (typically one after another), and the rendered tiles are then recombined to provide the complete render output, e.g. a render pass or a frame to be displayed.

Once all the primitives to be rendered have been appropriately processed, e.g. transformed, and/or, e.g. generated by the geometry shader 104, the tiler 105 then determines which primitives need to be processed for each tile into which the render output has been divided for processing purposes. To do so, the tiler 105 compares the location of each primitive to be processed with the tile positions, and adds the primitive to a respective primitive list for each tile within which it determines the primitive could (potentially) fall. Any suitable and desired technique for sorting and binning primitives into tile lists, such as exact binning, bounding box binning or anything in between, may be used for the tiling process.

Once the tiler 105 has completed the preparation of the primitive tile lists (lists of primitives to be processed for each tile), each tile is then rendered. To do so, each tile is processed by the graphics processing pipeline stages shown in FIG. 1 that follow the tiler 105. Thus, when a given tile is being processed, each primitive that is to be processed for that tile (that is listed in a tile list for that tile) is passed to a rasteriser 106.

The graphics processing pipeline 10 further comprises an early Z (depth) and stencil test stage 107, a renderer in the form of a fragment shading state 108, a late Z (depth) and stencil test stage 109, a blending stage 110, a tile buffer 111, and a tile write out stage 112 that performs down sampling and write out (multisample resolve). The one or more so-called tile buffers 111 store rendered fragment data at the end of the pipeline until a given tile is completed and written out to an external memory, such as a frame buffer 113, for use. In some tile-based graphics processing pipelines, the rendered fragment data is compressed before being written out to the external memory. The tile buffer 111 is provided as part of RAM that is located on (local to) the graphics processing pipeline (chip).

The data from the tile buffer 111 is input to a tile write out unit 112, and then output (written back) to an external memory output buffer, such as a frame buffer 113 of a display device (not shown). The display device may comprise, for example, a display comprising an array of pixels, such as a heads-up display, vehicle management display or icons and display attributes that show safety critical elements such as a vehicle speedometer, electrical power or fuel gauge.

Once a tile of the render output has been processed and its data exported to a main memory (e.g. to a frame buffer 113 in a main memory) for storage, the next tile is then processed, and so on, until sufficient tiles have been processed to generate the entire render output (e.g. frame to be displayed). The process is then repeated for the next render output (e.g. frame) and so on. It should be noted that multiple tiles may be processed concurrently, for example each execution unit (e.g. shader core) may process a separate tile in parallel.

Other arrangements for a graphics processing pipeline are or course possible. The graphics processing pipeline 10 may be executed on and implemented by an appropriate graphics processing unit (GPU) that includes the necessary functional units, processing circuitry, etc., operable to execute the graphics processing pipeline stages.

In order to control a graphics processor (GPU) that is implementing a graphics processing pipeline to perform the desired graphics processing pipeline operations, the graphics processor typically receives commands and data from a driver, e.g. executing on a host processor (e.g. CPU), that indicates to the graphics processor the operations that it is to carry out and the data to be used for the operations. As discussed herein the driver includes a command stream front end to accept high-level commands from an application, parsing commands and translating them into low-level commands that GPU can execute.

Figure 2:
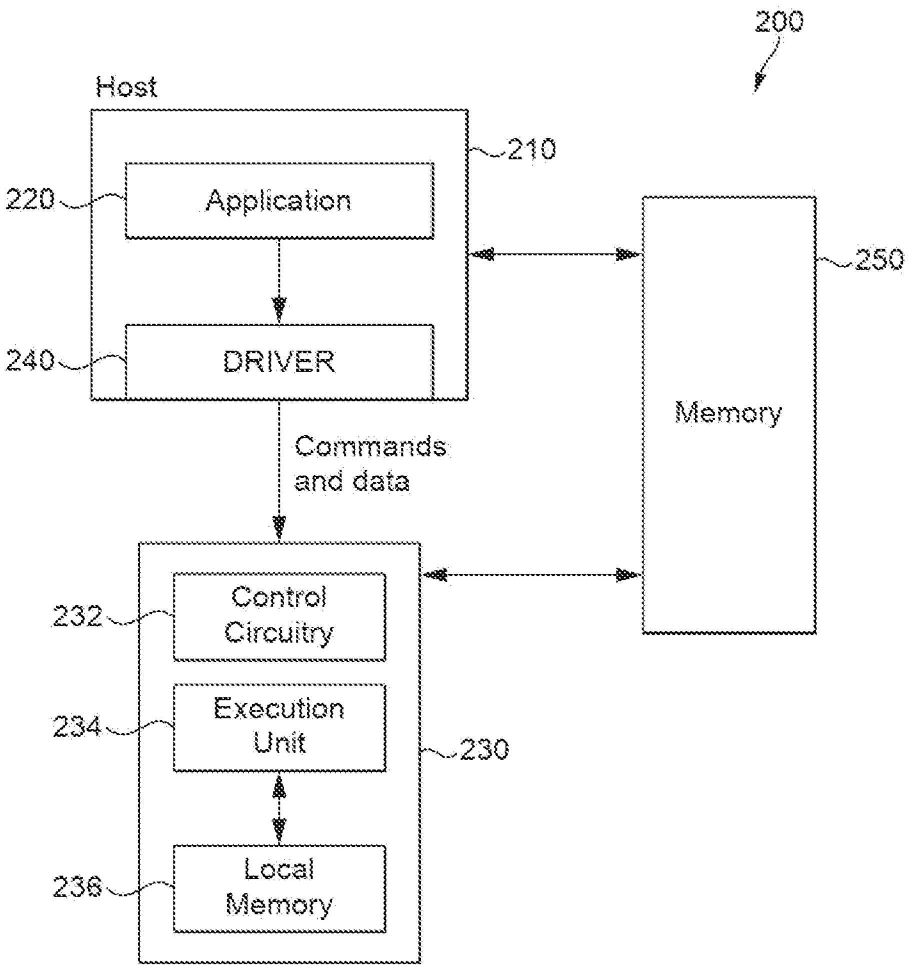
FIG. 2 shows an exemplary graphics processing system.

Accordingly, FIG. 2 shows schematically a typical computer graphics processing system 200, in which an application 220 executes on a host processor 210. When the application 220 requires graphics processing operations to be performed by an associated graphics processing unit (graphics processing pipeline) 230, it generates appropriate Application Programming Interface (API) calls that are interpreted by a driver 240 for the graphics processor 230 running on the host processor 210, to generate appropriate instructions (and data structures) to the graphics processor 230. The graphics processor 230 then generates graphics output required by the application 220 using the instructions (and data structures).

In particular, the graphics processor 230 comprises control circuitry (e.g. an iterator) 232, at least one (and in some embodiments more than one) execution unit 234 and a local memory 236 (e.g. tile buffer) (where there are more than one execution unit, each execution unit preferably has its own associated local memory). A set of instructions is provided to the graphics processor 230 in response to instructions from the application 220 running on the host system 210 for graphics output (e.g. to generate a frame to be displayed). For example, the driver 240 may send commands and data to the graphics processor 230 by writing to memory 250. The control circuitry 232 breaks up the commands and data into one or more processing tasks, and assigns the tasks to the at least one execution unit 234, which processes the tasks in turn and outputs the processing results to the local memory 236. When a task completes, the processing output is written to memory 250.

Figure 3:
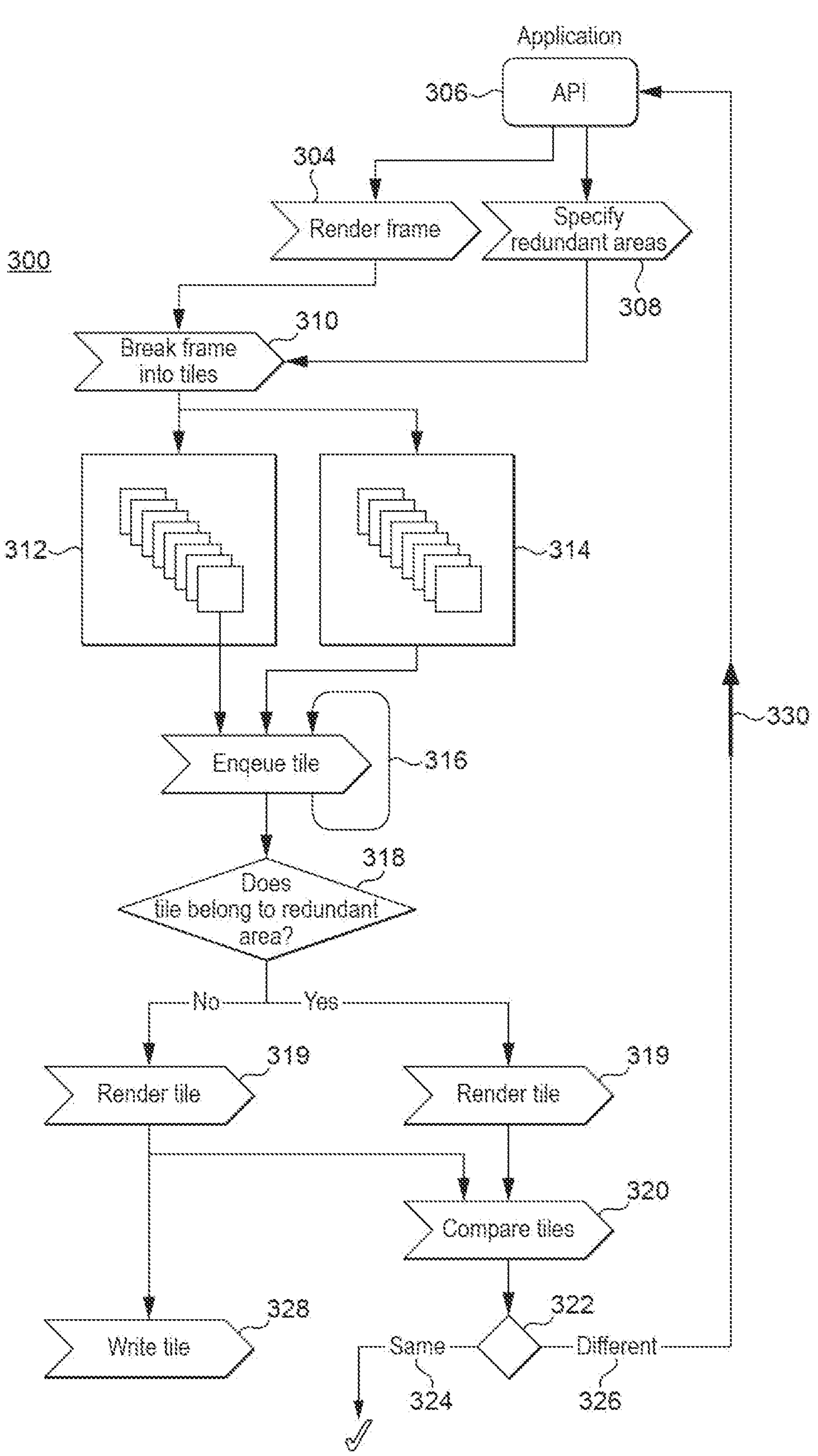
FIG. 3 shows a processing pipeline operated by a driver.

Referring to FIG. 3, a processing pipeline operated by a driver 300 is shown in a schematic form suitable for implementing present techniques. A frame is selected for render 304 based upon instructions provided in software from an Application Programming Interface (API) 306.

GPU instruction level programming is typically done through the Application Programming Interface (API) 306 provided by the GPU vendor. Graphics APIs such as Vulkan (KHRONOS™) offer interfaces for developers to interact with the GPU and write code that specifies the sequence of instructions to be executed by the GPU. Through the graphics API 306, users can compile and send shader code to the GPU where it is executed to perform various tasks such as vertex processing, pixel shading, texture mapping, rasterization and compute tasks.

A user has programmed the API 306 to specify redundant areas 308 of the display for processing along with the render 304. If the frame is an area of display which has a safety critical display, then it is very likely that the user will have specified all or part of that frame for redundancy processing alongside the normal display processing. The frame is then broken up into tiles 310 since through the API 306, the user has specified screen areas for redundancy 308 and the driver 300 therefore flags and maps those areas to tiles. Processing tiles 312 are selected for processing and ultimate display and of those processing tiles 312, all or a subset of tiles are selected as redundant tiles 314 for redundancy processing and comparison purposes with the processing tiles 312, but not display. The driver 300 therefore identifies processing tiles 312 marked as redundant tiles 314 and submits a stream of command instructions to instruct execution units to duplicate/schedule such processing tiles 312 as redundant tiles 314 for processing and comparison.

A sequence of frames may require a certain number of frames per second (fps)—say 60 fps and a frame may comprise 100, 1000 or more tiles per frame. To process one tile at a time or in parallelisation, the tiles are enqueued and so each tile is enqueued 316 and dispatched to a core or per core to achieve parallelisation. Through the enqueue 316 a tile is placed in a queue so that it can be processed in a first-in-first-out manner and executed in the order the tile was added to the queue.

At 318, depending upon the chosen mode of operation, one or more execution unit(s) process(es) either the processing tiles 312 or the redundant tiles 314. At rendering 319 the same computation is executed on the same tile area of the screen, but it will be a different tile from the execution unit's point of view.

At 320 a comparison is made between the processing tiles 312 and the redundant tiles 314, whereupon a decision 322 determines whether the graphics processing pipeline has resulted in the same output 324 or a different output 326 as compared between the two sets of tiles, the processing tiles 312 and associated redundant tiles 314. Output 324 or different output 326 is output data from the graphics processing pipeline that gets compared and in embodiments this output data can be the render output for the tile.

The output data can also be some data that is based on that output data such a checksum, hash or Cyclic Redundancy Check (CRC) whereby a CRC value based on the contents of data is generated and if the contents of the data changes, then the CRC value also changes. In this way, the comparison is being made not upon the output data itself, but instead upon data that is calculated as a basis for the comparison.

In the event of a different output 326 then a signal 330 is communicated to the API 306 in order that a predetermined policy can be implemented. In the event of a same output 324 then typically the graphics processing continues without a need for any predetermined policy to be implemented. In such an outcome the processing tiles 312 are written to output 328 such as a frame buffer.

Present techniques offer control of the redundancy policy: these include redundancy with time, so-called temporal redundancy or redundancy on different cores, so-called spatial redundancy. Therefore present techniques allow a tile to be executed on the same core or different core, the two tiles executed at the same time (if GPU cores are available) or with some delay (to provide time redundancy). Since a user can select a redundancy policy through the API 306, the user can select on which tiles redundancy is applied, thus offering control of the processing overhead.

Present techniques include a hardware element in the form of a tile comparator. The tile comparator enables redundancy comparison to be made without having to duplicate the entire tiler or graphics pipeline. This compromise balances safety with limited processing cost and overhead. Present techniques, include software as part of the API 306 to select redundant tiles and GPU core mapping.

Redundancy checking is used to detect a hardware bit flip for instance. When doing a safety analysis of a system one computes the probability of such events and decides whether this is acceptable or whether a safety mechanism should be put in place to detect and recover. Present techniques allow a display with multiple safety clusters and use different redundancy policies depending on what is being displayed. Present techniques allow for increasing the amount of redundancy in software as the hardware ages and a probability of a bit flip increases.

FIGS. 4, 5, 6, 7 and 8 below show in more detail the processing pipeline described in respect of FIG. 3.

Figure 4:
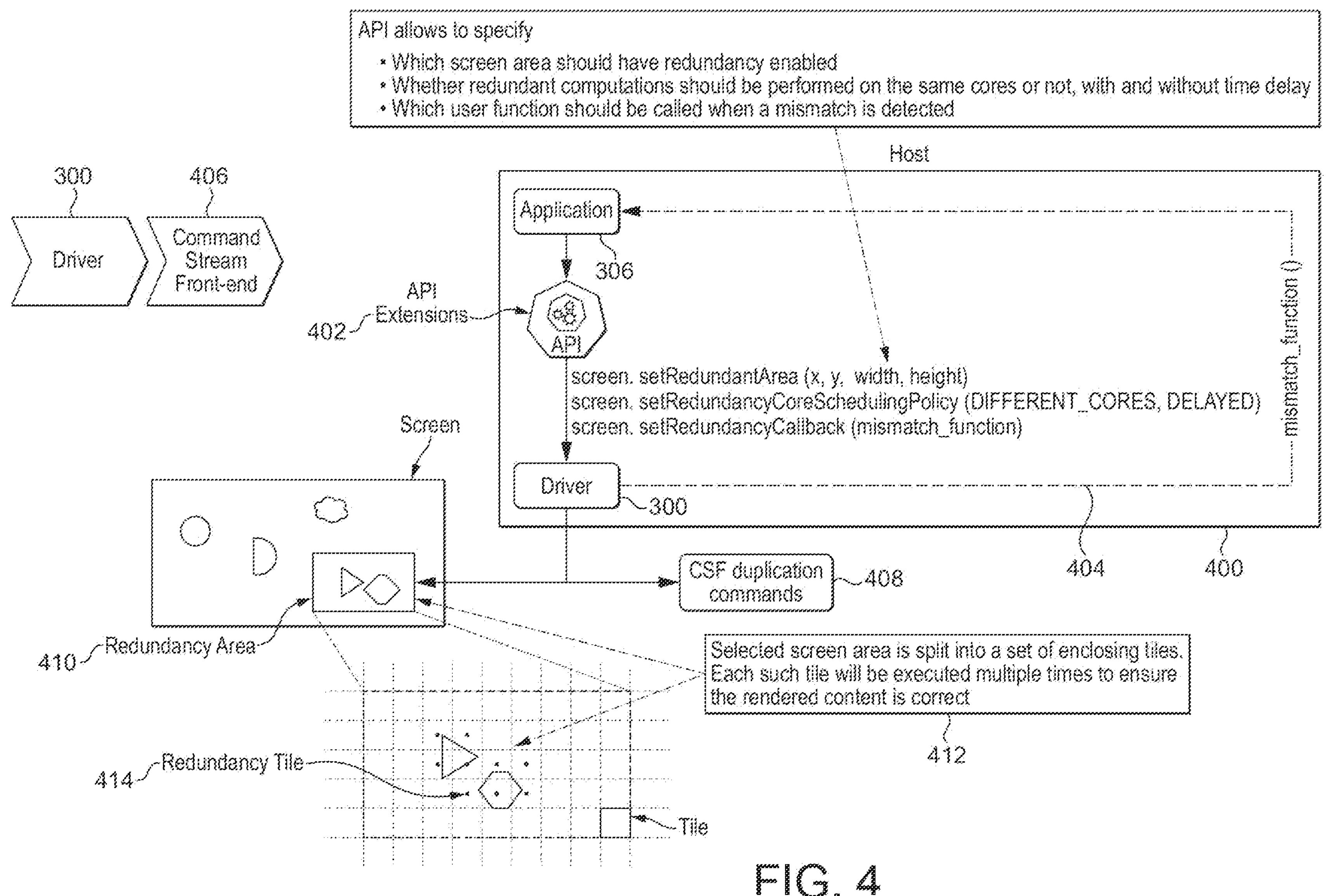
FIG. 4 shows an Application Programming Interface.

Referring to FIG. 4, the Application Programming Interface (API) 306 is shown schematically in more detail on a host 400. Under control of a user, the API 306 allows a choice over which screen area should have redundancy enabled, whether redundant computations should be performed on the same execution engines or not eg., the same shader core and with or without time delay. Also, a user can specify which user function should be called when a mismatch is detected.

API 306 comprises API extensions 402 set to determine redundancy parameter. Example API extensions 402 include:

1) To set a screen area for capturing redundant tiles for processing, an API extension can be: screen.setRedundantArea (x,y, width, height);
2) To set an execution unit eg., shader core, scheduling policy an API extension can be: screen.setRedundancyCoreSchedulingPolicy (DIFFERENT_CORES, DELAYED)
3) To set an outcome or feedback loop when a mismatch is determined at the tile comparator, an API extension can be: screen.setRedundancyCallback (mismatch_function). A mismatch function is communicated from the driver 300 to the API 306 by way of a return loop 404.

The API extensions 402 are communicated to the driver 300 (described in more detail in FIG. 3) which instructs the command stream frontend 406 to issue commands for tile duplication 408 in the selected area. The selected area can be termed a redundancy area 410. Accordingly at 412, each selected screen is split into a set of enclosing tiles and each tile is executed multiple times to ensure the rendered content is correct. At 414, a redundancy tile is shown as a tile that is selected for redundancy because the redundant tile is shared with a tile selected as part of an image selected for render.

Figure 5:
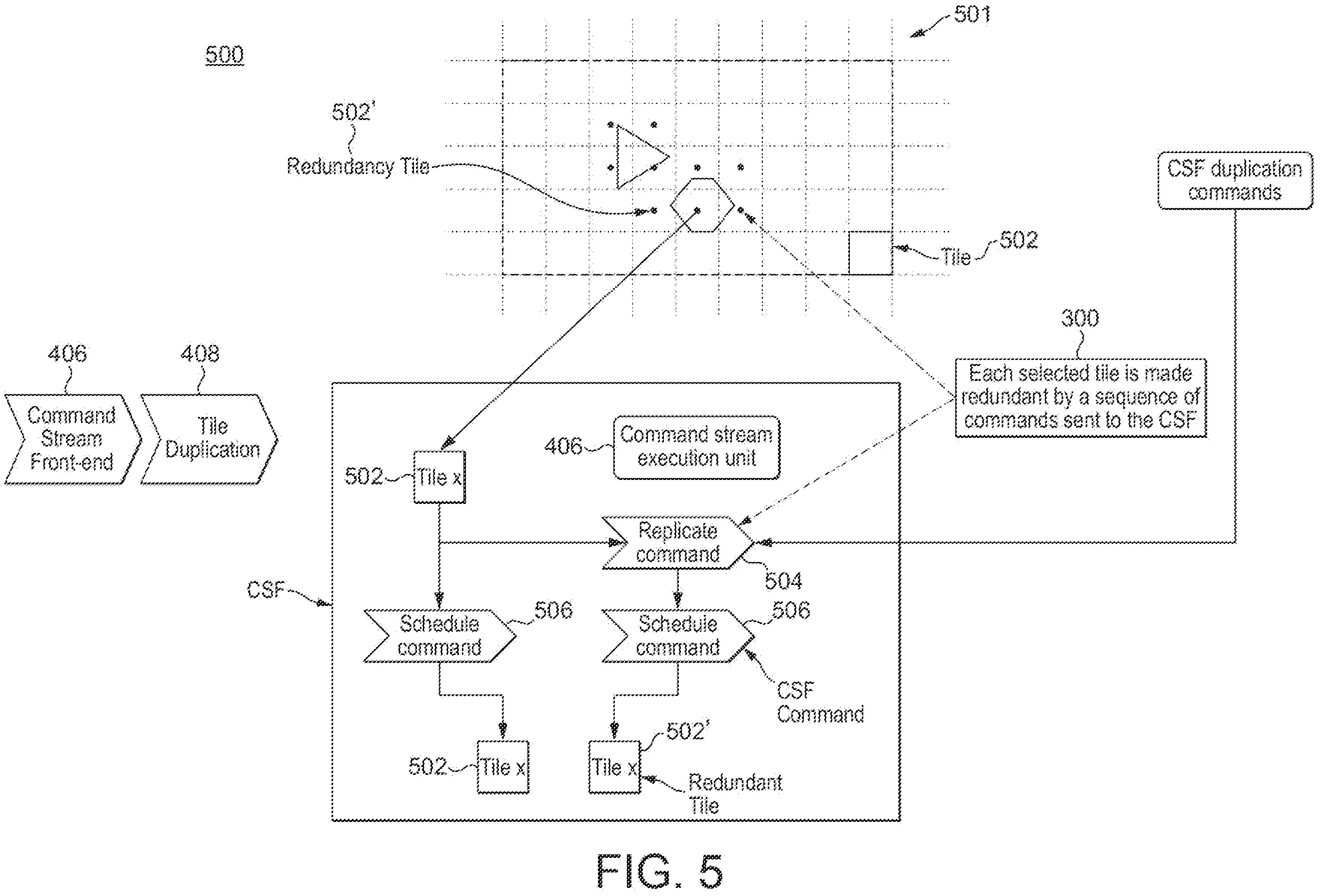
FIG. 5 shows a tile duplication stage.

Referring to FIG. 5, a tile duplication stage 500 is shown. The role of the command stream frontend 406 and tile duplication 408 is shown in a schematic format. An image 501 for processing is divided into a tile 502 and selected for rendering and each selected tile 502 is made redundant by a sequence of replicate commands 504 sent to the command stream front end 406 from driver 300. Each tile 502 and redundant tile 502' receive a schedule command 506 for processing to result in both a selected tile 502 and redundant tile 502' being dispatched for processing under the instructions of the command stream front end 406.

Figure 6:
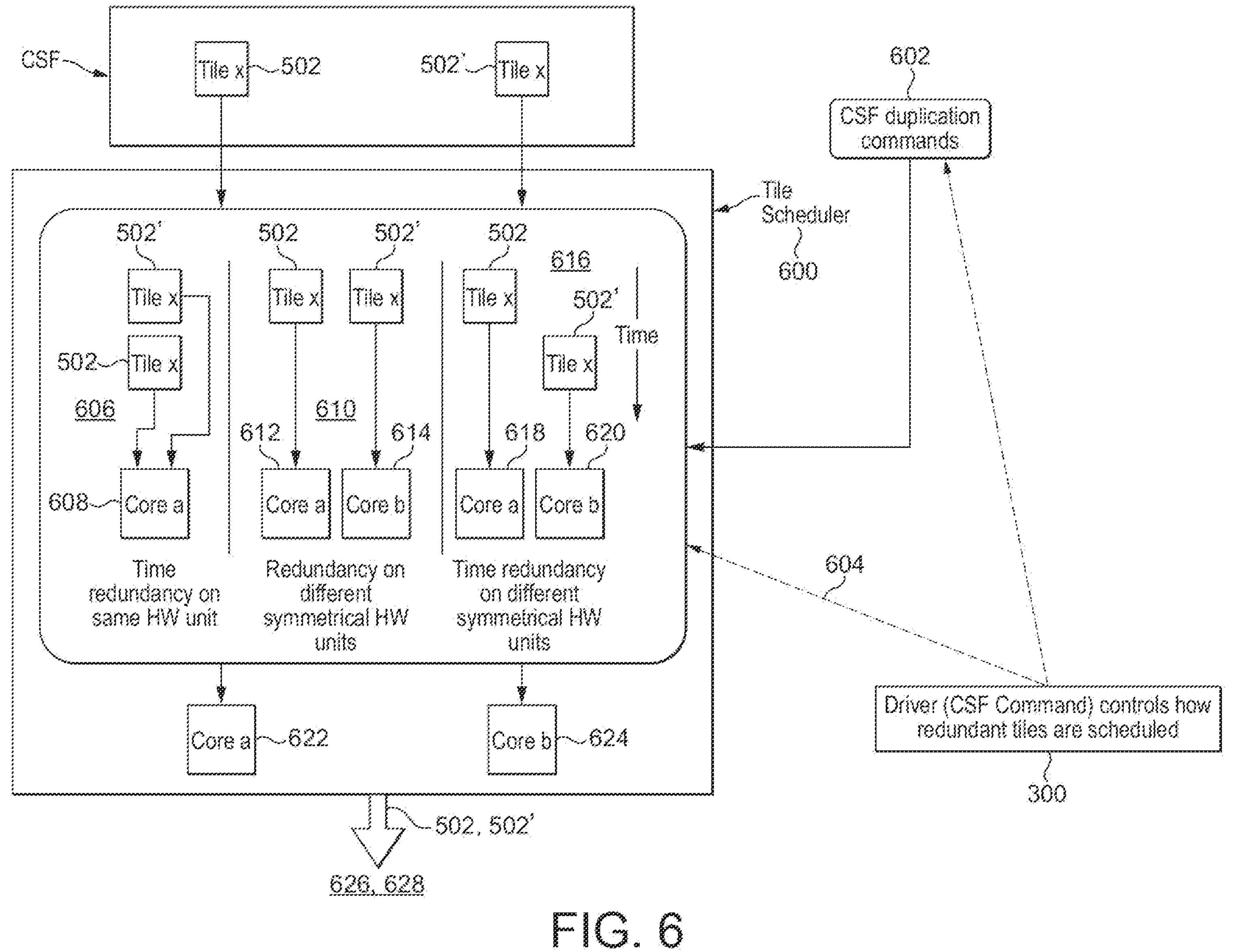
FIG. 6 shows a flow of selected tile and redundant tile to illustrate options for a tile scheduler.

FIG. 6 continues the flow of the selected tile 502 and the redundant tile 502' to illustrate options for a tile scheduler 600. As shown schematically in FIG. 6, a tile scheduler 600 is controlled by the driver 300 issuing commands through the command stream front end 406 to control how redundant tiles are scheduled. Such scheduling is defined at the API 306 level together with instructions for the driver 300 to issue commands on which tiles are duplicated 602 and scheduled 604.

Referring to FIG. 6, three example processing paths are shown schematically with flow of time shown on the right hand side of the diagram.

First processing path 606 is a time redundancy path on a same execution unit. As such, selected tile 502 and redundant tile 502' are dispatched to shader core 608 for processing where selected tile 502 is processed ahead in time of redundant tile 502' or vice versa.

Second processing path 610 is a redundancy path on different execution units 612, 614. As such, selected tile 502 and redundant tile 502' are dispatched to different shader cores 612, 614 for processing at the same time on so-called symmetrical execution units 612, 614.

Third processing path 616 is a time redundancy path on symmetrical execution units 618, 620. As such, selected tile 502 and redundant tile 502' are dispatched to different shader cores 622, 624 processing where selected tile 502 is processed ahead of time of redundant tile 502' or vice versa.

Therefore, an output of the tile scheduler 600 shown in FIG. 6, is a dispatch of selected tile 502 and redundant tile 502' to an execution unit 626, 628 depending upon the programmed processing path.

Figure 7:
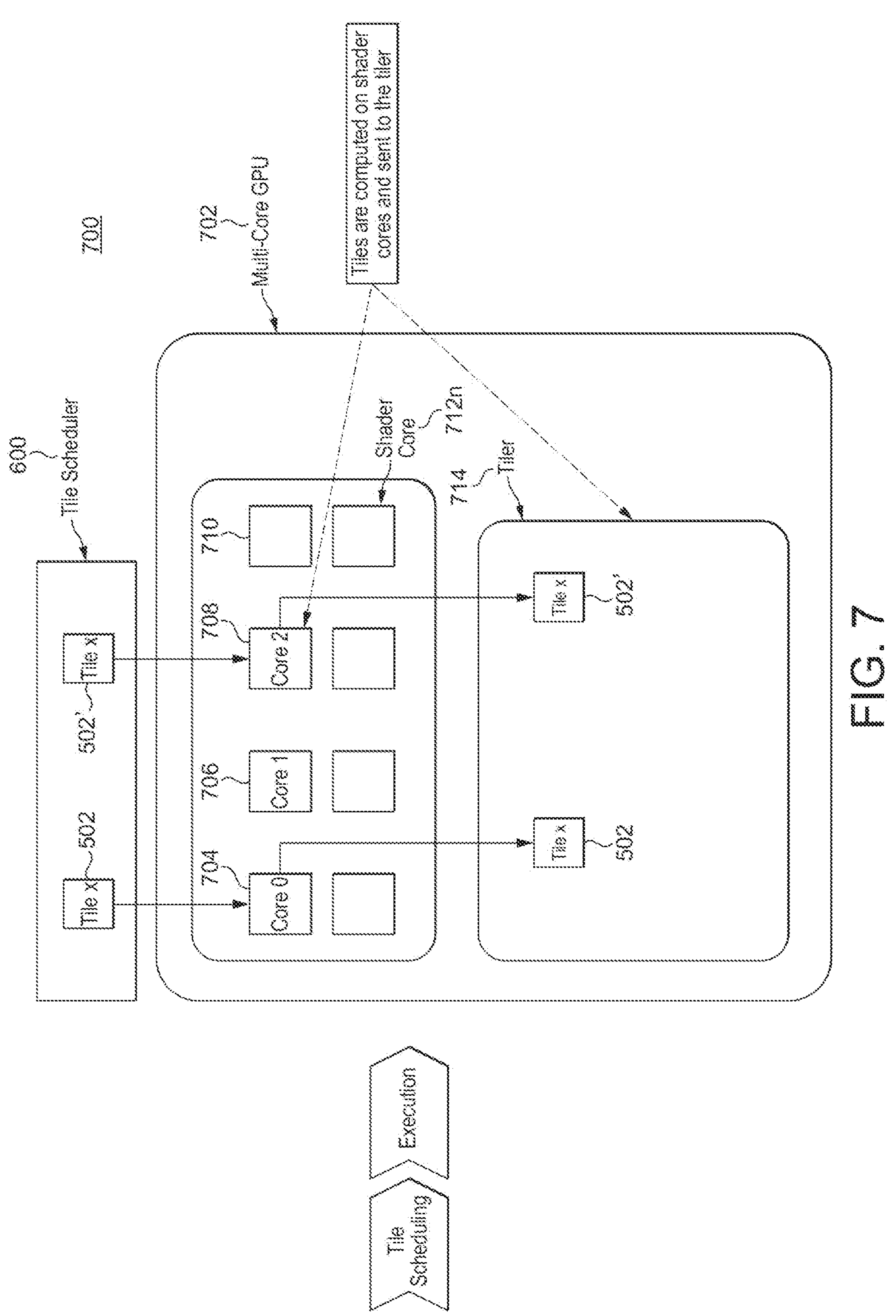
FIG. 7 shows a tile scheduling and execution stage.

FIG. 7 shows a tile scheduling and execution stage 700. Referring to FIG. 7 multi-core GPU 702 is communicating with the tile scheduler 600. In a multi-core GPU 702 selected tiles 502 and redundant tile 502' are processed on shader cores 704, 706, 708, 710, **712*n* and sent to a tiler 714**.

Figure 8:
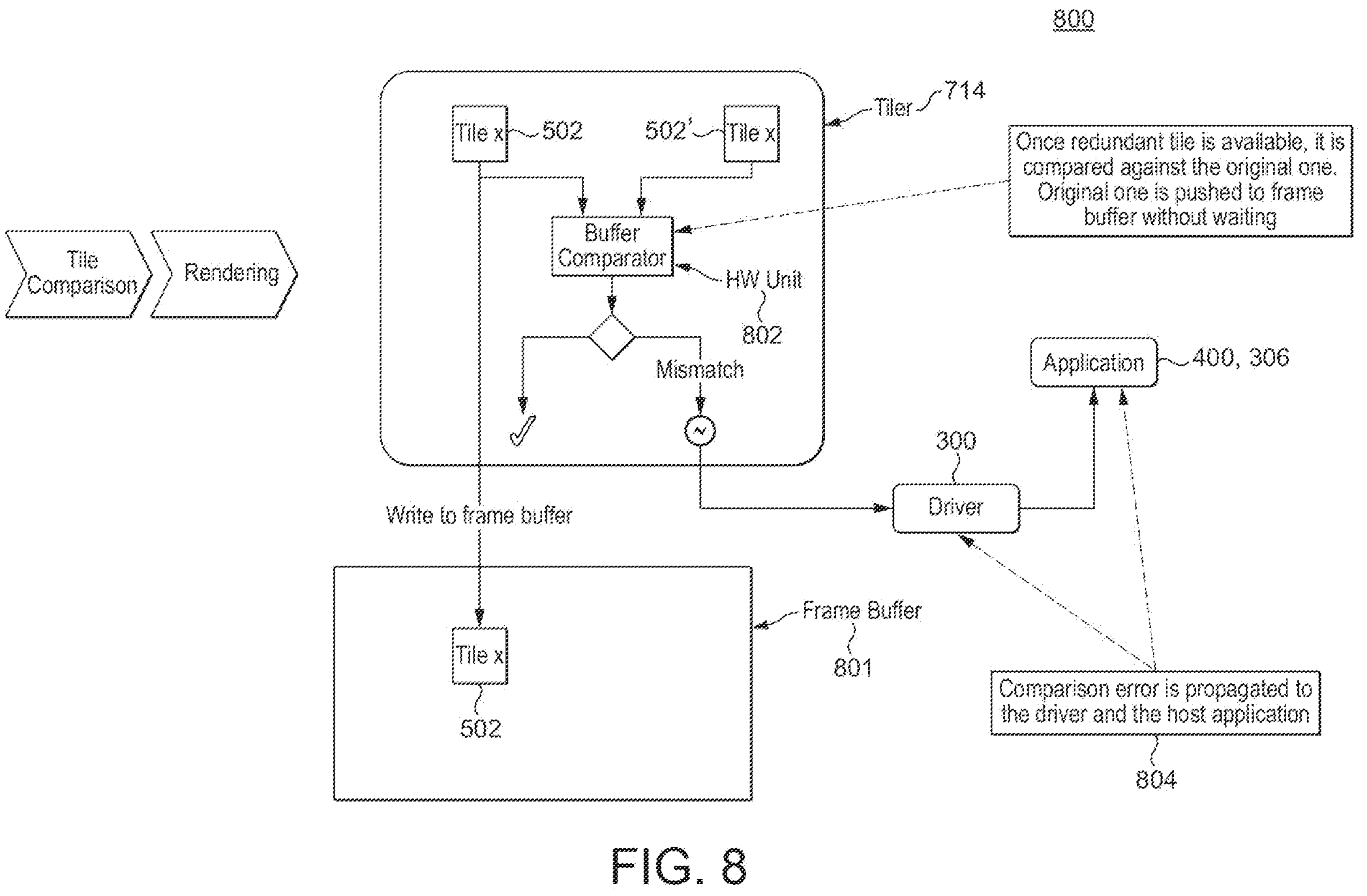
FIG. 8 shows a tile comparison and rendering stage.

FIG. 8 shows a tile comparison and rendering stage 800 when the tiler 714 has received the processed selected tile 502 and redundant tile 502'. Once both the processed selected tile 502 and redundant tile 502' are available from the shader cores **712*n*, the redundant tile 502' can be compared against the selected tile 502. Meanwhile, the selected tile 502 is written to a frame buffer 801**.

The tiler 714 comprises a buffer comparator 802, a hardware unit configured to determine 804 whether there is a mismatch between the processed selected tile 502 and redundant tile 502'. In the event of a mismatch, a comparison error 804 is propagated to driver 300 and back to the host 400 with API 306. In the event of no mismatch then no action is required.

Present techniques therefore provide a feature in software created at API level to enable a user to specify which part of a frame should run redundancy. When a user elects to run redundancy then that election is mapped to some tiles and a process of tile duplication and comparison is then put in place on software side only for the tiles that the user specifies. The process may include extending the instruction set of the GPU or if not at the instruction set level at the descriptor level to tag some instruction or flag to the writer to the tiler to indicate to the tiler whether the instruction is the first or the second one and then the tiler would receive all the pixels for a given tile, calculate two copies and decide if they are identical or not using the buffer comparator and if the tiles are not identical then raise a flag that there is a problem and something wrong.

A collaboration between the API level to enable the software feature and the compiler to generate appropriate code and a hardware element configured to handle the redundancy and the comparison are provided.

Example

A User OEM creating the display for cockpit of a car. Some display areas are more important and safety critical than others, so the OEM specifies redundancy at the more important area and safety critical areas of display at the API level.

The graphics processor in present techniques can be any suitable and desired graphics processor that includes a programmable execution unit operable to execute (shader) programs to perform processing operations. The graphics processor may otherwise be configured and operable as desired, and be configured to execute any suitable and desired form of graphics processing pipeline (in its normal graphics processing operation).

The programmable execution unit of the graphics processor may be any suitable and desired such execution unit, such as, and preferably, an appropriate execution engine of an execution core of the graphics processor. Thus, the programmable execution unit of the graphics processor is preferably part of and comprised in an appropriate (shader) execution (processing) core of the graphics processor. The graphics processor may comprise a single programmable execution unit (and execution core), or plural execution units (and execution cores), as desired.

The graphics processor (its execution core(s)), may, for example, and preferably, comprise further components and units necessary for the execution of (shader) programs, such as, for example, and preferably, local storage for data for use by execution threads when the execution unit is executing a (shader) program, preferably in the form of a register file, and a load/store unit (circuit) operable to load and store data for use (e.g. from memory to the local storage (register file) and from the local storage to memory), when executing a program.

The graphics processor preferably also comprises an appropriate control unit (circuit) that is operable to, and configured to, control the execution of programs to perform processing operations by the execution unit of the graphics processor. Most preferably, this control unit is in the form of an appropriate thread group (warp) manager that is operable to create (spawn) groups of execution threads for execution, and schedule and control the execution of (shader) programs by such groups of threads by the programmable execution unit.

Any communication to the control unit of the graphics processor for a thread group (warp) that is to execute a shader program should, and preferably does, convey all required information for the execution of the (shader) program appropriately to the graphics processor (to the control unit (warp manager) of the graphics processor). This information includes an indication of the (shader) program to be executed, e.g., and preferably, in the form of a pointer to a (e.g. descriptor for the) program in memory; an indication of any state or other information needed for the (shader) program execution (this may be, and is preferably, provided as part of the descriptor for the (shader) program that is stored in memory); an indication of any other information, such as resource information, that may be needed for the program execution, again, e.g., and preferably, in the form of a pointer to appropriate to that information (e.g. a resource table) in memory; and information describing any inputs and outputs (input sources and output sources) for the processing operation in question, e.g., and preferably, in terms of where and how such inputs and outputs are stored/are to be stored.

Thus, subject to any particular requirements in accordance with the present invention, the program execution by the programmable execution unit of the graphics processor may, and preferably does, proceed and operate in the normal manner for (shader) program execution in the graphics processor in question.

As will be appreciated by one skilled in the art, the present techniques may be embodied as a system, method or computer program product. Accordingly, the present techniques may take the form of an entirely hardware embodiment, an entirely software embodiment, or an embodiment combining software and hardware.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object-oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high-speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

The examples and conditional language recited herein are intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its scope as defined by the appended claims.

Furthermore, as an aid to understanding, the above description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to limit the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labelled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

Clauses

1. A method of operation of a tile-based Graphics Processor, comprising:

receiving an instruction to process data to produce an output;

detecting an indicator that a portion of the output is to be processed with redundancy;

associating the indicator with at least one tile associated with the portion of the output;

duplicating the processing of the data associated with the at least one tile by one or more execution units of the graphics processor to produce output data for each of a first and a second instance of the at least one tile;

comparing output data for the first and the second instances of the at least one tile generated by the one or more execution units of the graphics processor; and responsive to detection of a mismatch between the output data of the first and the second instances, communicating a signal.

2. The method of clause 1, wherein the indicator that a portion of the data is to be processed with redundancy comprises a marker associated with the portion of the data.

3. The method of any clause, wherein the indicator that a portion of the data is to be processed with redundancy is generated by a host processor in response to a given command defined by an Application Programming Interface.

4. The method of any clause, wherein the indicator that a portion of the data is to be processed with redundancy comprises a modified instruction of the graphics processor.

5. The method of any clause, wherein the indicator that a portion of the data is to be processed with redundancy is selective, the one or more selections being responsive to a predetermined criticality value of the portion of the data.

6. The method of clause 2, wherein the marker is a data descriptor comprising coordinates indicating a location of the portion of the data to be processed with redundancy.

7. The method of any clause, wherein processing the data associated with the at least one tile by one or more execution units of the graphics processor comprises processing by a pair of execution units with temporal redundancy.

8. The method of any clause, wherein processing the data associated with the at least one tile by one or more execution units of the graphics processor comprises processing by a pair of execution units with spatial redundancy.

9. The method of any clause, wherein processing the data associated with the at least one tile by one or more execution units of the graphics processor comprises processing the first copy and subsequently the second copy by a single execution unit.

10. The method of any clause, wherein the output data of the first instance is output to a tile buffer.

11. The method of any clause, wherein the data to produce an output includes one or more of data composing an image, image data, display data, texture data, depth data, shading data or compute data.

12. Tile-based graphics processor comprising one or more execution units and a comparator, wherein the one or more execution units comprise circuitry configured to receive from the processor data for processing associated with at least one tile to produce output data for each of a first and second instance of the at least one tile, wherein the comparator comprises circuitry for comparing output data for the first and second instances of the at least one tile generated by the one or more execution units of the graphics processor; and responsive to detection of a mismatch between the output data of the first and second instances, circuitry configured to communicate a signal.

13. The graphics processor of clause 12, wherein the one or more execution units are shader core(s).

14. The graphics processor of clause 12 or 13, comprising instruction processing circuitry configured to receive an instruction to process data to produce an output, detect an indicator that a portion of the output is to processed with redundancy and associate the indicator with at least one tile associated with the portion of the output; thereby to cause on the one or more execution units of the graphics processor to duplicate processing of the data associated with the at least one tile to produce output data for each of a first and a second instance of the at least one tile.

15. A method implemented by a driver on a host processor; wherein the method includes responsive to an Application Programming Interface (API) command indicating a portion of data is to be processed with redundancy communicating by the driver to a graphics processor configured as a tile-based graphics processor:

an instruction to process the data to produce an output; and an indicator that the portion of the output is to be processed with redundancy.

16. The method of clause 15, wherein communicating the instruction and the indicator, causes the graphics processor to carry out the method of:

receiving an instruction to process data to produce an output according to a set of tiles within a rendering operation and detecting the indicator that a portion of the data is to be processed with redundancy;

associating the indicator with at least one tile containing the portion of data; duplicating the processing of the data associated with the at least one tile by one or more execution units of the graphics processor to produce output data for each of a first and a second instance of the at least one tile;

comparing output data for the first and second instance of the at least one tile generated by the one or more execution units of the graphics processor; and responsive to detection of a mismatch between the output data of the first and second instances, communicating a signal.

17. The method of clause 15 or 16, wherein the instructions include a selection of redundant tiles and graphics processor core mapping.

18. The method of clause 15, 16 or 17 wherein the instructions include setting a redundant tile area by image coordinates.

19. The method of clause 15, 16, 17 or 18, wherein the one or more execution units are shader cores.

20. A non-transitory computer readable storage medium storing software code which, when implemented by a driver on a host processor causes the driver to indicate that a portion of data is to be processed with redundancy and to communicate to a tile-based graphics processor an instruction to process the data to produce an output; and an indicator that the portion of the output is to be processed with redundancy.

It will be clear to one skilled in the art that many improvements and modifications can be made to the foregoing exemplary embodiments without departing from the scope of the present techniques.

The invention claimed is:

1. A method of operation of a tile-based Graphics Processor, the method comprising:

receiving an instruction to process data to produce an output;

detecting an indicator that a portion of the output is to be processed with redundancy, the indicator further indicating a redundancy policy selected for the portion of the output, wherein the redundancy policy comprises temporal redundancy and/or spatial redundancy;

associating the indicator with at least one tile associated with the portion of the output;

duplicating, according to the selected redundancy policy, the processing of the data associated with the at least one tile by one or more execution units of the graphics processor to produce output data for each of a first and a second instance of the at least one tile;

comparing output data for the first and the second instances of the at least one tile generated by the one or more execution units of the graphics processor; and responsive to detection of a mismatch between the output data of the first and the second instances, communicating a signal.

2. The method of claim 1, wherein the indicator that a portion of the data is to be processed with redundancy comprises a marker associated with the portion of the data.

3. The method of claim 2, wherein the marker is a data descriptor comprising coordinates indicating a location of the portion of the data to be processed with redundancy.

4. The method of claim 1, wherein the indicator that a portion of the data is to be processed with redundancy is generated by a host processor in response to a given command defined by an Application Programming Interface.

5. The method of claim 1, wherein the indicator that a portion of the data is to be processed with redundancy comprises a modified instruction of the graphics processor.

6. The method of claim 1, wherein the indicator that a portion of the data is to be processed with redundancy is selective responsive to a predetermined criticality value of the portion of the data.

7. The method of claim 1, wherein duplicating, with temporal redundancy, the processing of the data associated with the at least one tile by one or more execution units of the graphics processor comprises processing a first copy of the data and subsequently a second copy of the data by a single execution unit.

8. The method of claim 1, wherein the output data of the first instance is output to a tile buffer.

9. The method of claim 1, wherein the data to produce an output includes one or more of data composing an image, image data, display data, texture data, depth data, shading data or compute data.

10. A tile-based graphics processor comprising one or more execution units, instruction processing circuitry, and a comparator;

wherein the one or more execution units comprise circuitry configured to receive from the processor data for processing associated with at least one tile to produce output data;

wherein the instruction processing circuitry is configured to:

receive an instruction to process data to produce an output, detect an indicator that a portion of the output is to be processed with redundancy, the indicator further indicating a redundancy policy selected for the portion of the output, wherein the redundancy policy comprises temporal redundancy and/or spatial redundancy, and associate the indicator with at least one tile associated with the portion of the output; thereby to cause the one or more execution units to duplicate, according to the selected redundancy policy, processing of the data associated with the at least one tile to produce output data for each of a first and second instance of the at least one tile;

wherein the comparator comprises:

circuitry for comparing output data for the first and second instances of the at least one tile generated by the one or more execution units of the graphics processor, and circuitry configured to communicate a signal responsive to detection of a mismatch between the output data of the first and second instances.

11. The graphics processor as claimed in claim 10, wherein the one or more execution units are shader core(s).

12. A method implemented by a driver on a host processor; wherein the method includes responsive to an Application Programming Interface (API) command indicating a portion of data is to be processed with redundancy communicating by the driver to a graphics processor configured as a tile-based graphics processor:

an instruction to process the data to produce an output; and an indicator that the portion of the output is to be processed with redundancy, the indicator further indicating a redundancy policy selected for the portion of the output, wherein the redundancy policy comprises temporal redundancy and/or spatial redundancy, wherein communicating the instruction and the indicator, causes the graphics processor to carry out the method of:

receiving an instruction to process data to produce an output according to a set of tiles within a rendering operation;

detecting the indicator that a portion of the data is to be processed with redundancy and the redundancy policy selected for the portion of the output;

associating the indicator with at least one tile containing the portion of data;

duplicating, according to the selected redundancy policy, the processing of the data associated with the at least one tile by one or more execution units of the graphics processor to produce output data for each of a first and a second instance of the at least one tile;

comparing output data for the first and second instance of the at least one tile generated by the one or more execution units of the graphics processor; and responsive to detection of a mismatch between the output data of the first and second instances, communicating a signal.

13. The method of claim 12, wherein the instructions include a selection of redundant tiles and graphics processor core mapping.

14. The method of claim 12, wherein the instructions include setting a redundant tile area by image coordinates.

15. The method of claim 12, wherein the one or more execution units are shader cores.

* * * * *